United States Patent
Yamaguchi

(10) Patent No.: US 8,964,243 B2
(45) Date of Patent: Feb. 24, 2015

(54) IMAGE FORMING APPARATUS CAPABLE OF ENHANCING RESOLUTION OF IMAGE DATA IN HIGH QUALITY

(75) Inventor: Tomohiro Yamaguchi, Shinshiro (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1509 days.

(21) Appl. No.: 12/558,018

(22) Filed: Sep. 11, 2009

(65) Prior Publication Data

US 2010/0060918 A1   Mar. 11, 2010

(30) Foreign Application Priority Data

Sep. 11, 2008  (JP) .................................. 2008-233640

(51) Int. Cl.
*G06F 15/00* (2006.01)
*H04N 1/409* (2006.01)
*H04N 1/40* (2006.01)

(52) U.S. Cl.
CPC ......... *H04N 1/40068* (2013.01); *H04N 1/4092* (2013.01)
USPC ............ 358/1.9; 358/2.1; 358/3.06; 382/266; 382/254; 347/131; 400/120.07

(58) Field of Classification Search
USPC .................... 358/1.2, 1.9, 2.1, 3.06; 348/625; 382/266, 254; 347/131
See application file for complete search history.

(56) References Cited

U.S. PATENT DOCUMENTS

| | | | |
|---|---|---|---|
| 5,719,967 A * | 2/1998 | Sekine | 382/266 |
| 5,805,304 A | 9/1998 | Sekine | |
| 7,126,722 B2 | 10/2006 | Ino et al. | |
| 2003/0026496 A1 * | 2/2003 | Nou | 382/264 |
| 2003/0107754 A1 * | 6/2003 | Ino et al. | 358/1.13 |
| 2003/0169439 A1 * | 9/2003 | Hanyu | 358/1.9 |

FOREIGN PATENT DOCUMENTS

| | | |
|---|---|---|
| JP | 5-16432 A | 1/1993 |
| JP | 5-84969 A | 4/1993 |
| JP | 5-276382 A | 10/1993 |
| JP | 06-164905 | 6/1994 |
| JP | 7-221976 A | 8/1995 |

(Continued)

OTHER PUBLICATIONS

Notice of Grounds of Rejection issued in the corresponding Japanese Patent Application No. 2008-233640 dated Mar. 30, 2010, and an English Translation thereof.

*Primary Examiner* — Martin Mushambo

(74) *Attorney, Agent, or Firm* — Buchanan Ingersoll & Rooney PC

(57) ABSTRACT

MFP matches low-resolution binary image data received by facsimile with a dot pattern showing a jaggy. If there is any matching region, the image data is converted into multivalued image data by performing jaggy correction in which the tone of a target dot in the region is substituted with a grayscale. MFP also generates a region identification attribute code based on the result of matching and the tone of the input image data. MFP enhances the respective resolutions of the image data after jaggy correction and the region identification attribute code. MFP then binarizes the image data having the enhanced resolution once again by a binarization method according to the region identification attribute code having the enhanced resolution.

21 Claims, 15 Drawing Sheets

(56) References Cited

FOREIGN PATENT DOCUMENTS

| JP | 08-079516 | 3/1996 |
| JP | 09-270911 | 10/1997 |
| JP | 10-145602 A | 5/1998 |
| JP | 11-331591 | 11/1999 |
| JP | 2003-179749 | 6/2003 |

* cited by examiner

FIG.8A    FIG.8B    FIG.8C    FIG.8D
 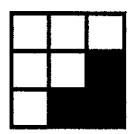 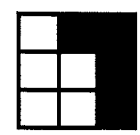 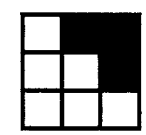
FIG.8E    FIG.8F    FIG.8G    FIG.8H
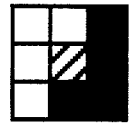 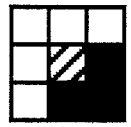 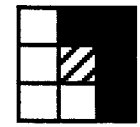 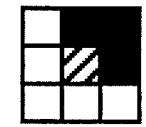

FIG.11A

| 0 | 0 | 0 |
|---|---|---|
| 1 | 0 | 0 |
| 1 | 1 | 1 |

FIG.11B

| 0 | 0 | 0 |
|---|---|---|
| 0 | 1 | 0 |
| 0 | 0 | 0 |

FIG.11C

| 00 | 00 | 00 |
|----|----|----|
| 10 | 01 | 00 |
| 10 | 10 | 10 |

FIG.12

| ATTRIBUTE | IMAGE | RE-BINARIZATION METHOD |
|---|---|---|
| 00 | WHITE DOT | LESS LIKELY TO BE BLACK DOT (BINARIZATION THRESHOLD VALUE:T1) |
| 01 | WHITE DOT (CORRECTED) | NORMAL (BINARIZATION THRESHOLD VALUE:T2) |
| 10 | BLACK DOT | LIKELY TO BE BLACK DOT (BINARIZATION THRESHOLD VALUE:T3) |
| 11 | BLACK DOT (CORRECTED) | NORMAL (BINARIZATION THRESHOLD VALUE:T2) |

FIG.14
FAX RECEIVED IMAGE (BINARY)
(A) 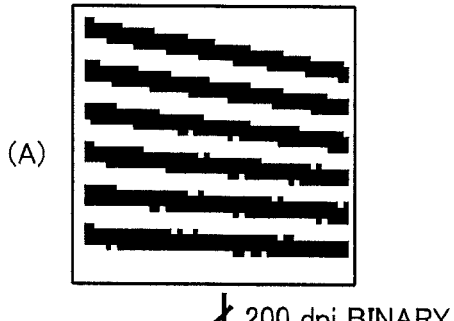
↕ 200 dpi BINARY
JAGGY CORRECTION
(B) 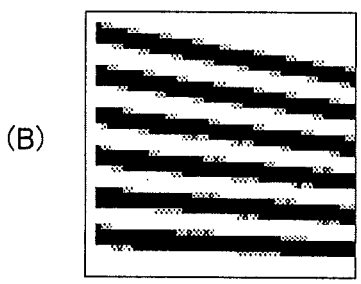
↕ 200 dpi MULTIVALUED
RESOLUTION CONVERSION
(C) 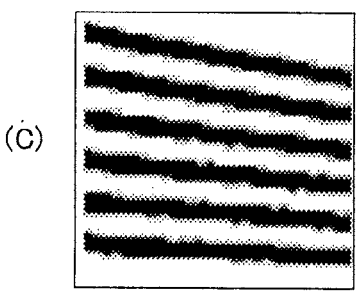
↕ 600 dpi MULTIVALUED
RE-BINARIZATION RROCESSING
(D) 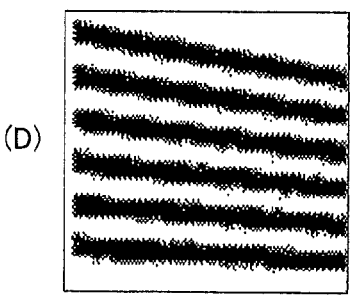

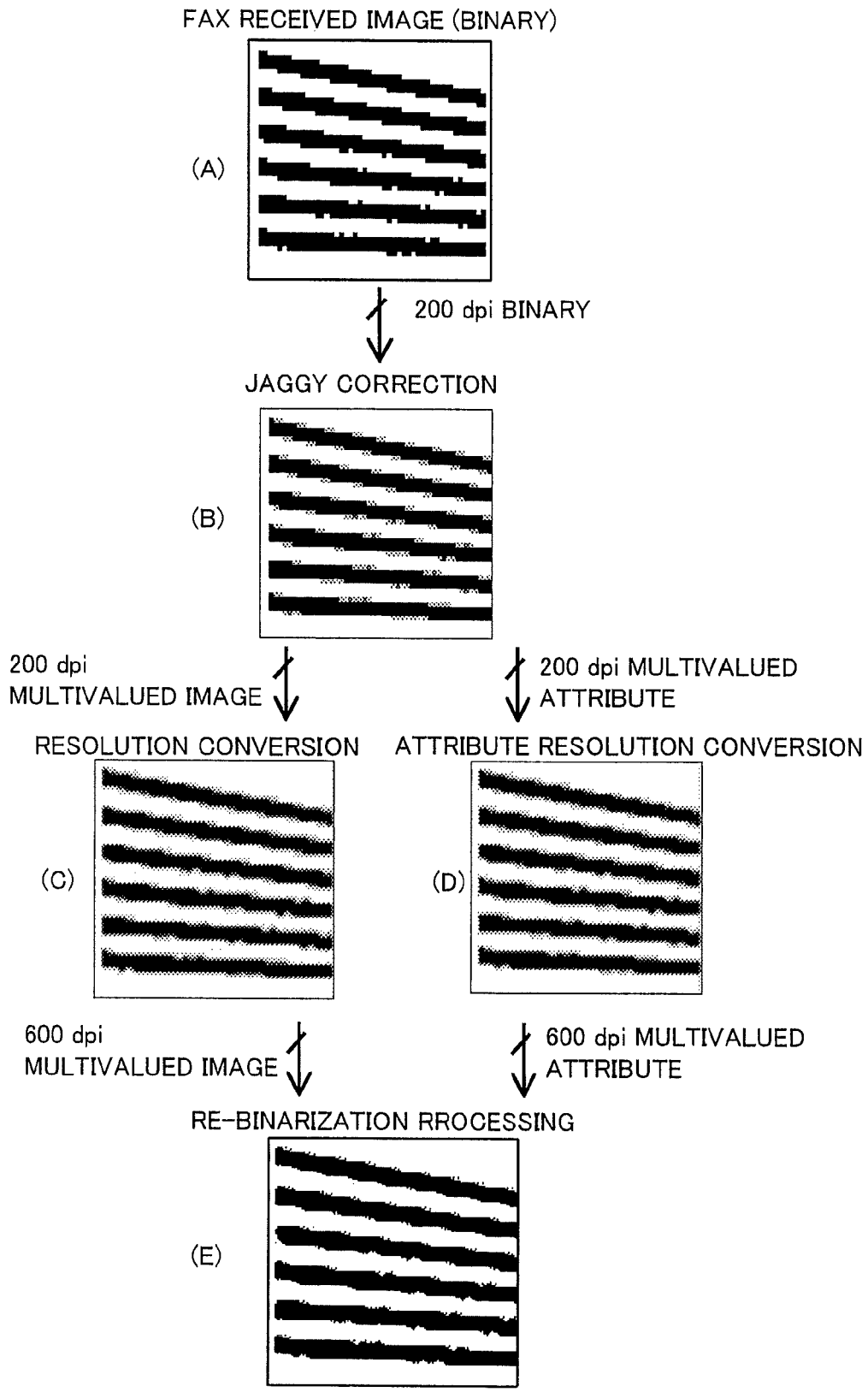

IMAGE FORMING APPARATUS CAPABLE OF ENHANCING RESOLUTION OF IMAGE DATA IN HIGH QUALITY

This application is based on Japanese Patent Application No. 2008-233640 filed with the Japan Patent Office on Sep. 11, 2008, the entire content of which is hereby incorporated by reference.

BACKGROUND OF THE INVENTION

1. Field of the Invention

The present invention relates to an image forming apparatus, an image processing method, and a medium having an image processing program recorded thereon, and more particularly to an image forming apparatus, an image processing method, and a medium having an image processing program recorded thereon for forming an image by enhancing the resolution of low-resolution image data.

2. Description of the Related Art

As a technique in printing binary images at a low resolution in facsimile machines and the like, it is proposed to enhance the resolution using a resolution conversion technique such as bilinear interpolation in order to conform to a high resolution in printing. For example, Japanese Laid-Open Patent Publication No. 05-276382 discloses a technique of visually smoothing an aliasing image by matching a dot pattern including a target dot and surrounding dots thereof with an identification pattern stored beforehand and by changing the target dot when they match.

The aforementioned resolution conversion technique, however, has a problem in that the effect of correcting jaggies is less sufficient as an original image is in lower resolution.

SUMMARY OF THE INVENTION

The present invention is made in view of the foregoing problem, and an object of the present invention is to provide an image forming apparatus, an image processing method, and a medium having an image processing program recorded thereon for improving jaggies that happen on slanting lines and the like when the resolution of low-resolution images to be printed out is enhanced to conform to a resolution in printing.

In order to achieve the aforementioned object, in accordance with an aspect of the present invention, an image forming apparatus includes an input device for inputting image data, and a controller configured to control operations of the image forming apparatus on binary image data input by the input device. Through control of the controller, the image forming apparatus i) performs pattern matching on the image data to detect a jaggy portion, and to reduce jaggies by converting the image data into multivalued image data and substituting the jaggy portion with a grayscale; ii) converts a resolution of the corrected image data into a resolution higher than that resolution; iii) generates an attribute code indicative of an attribute for each region of the corrected image data and converts a resolution of the attribute code into a resolution equal to the converted resolution of the image data; and iv) binarizes the image data having the converted resolution by a binarization method according to the attribute code having the converted resolution.

In accordance with another aspect of the present invention, an image processing method includes the steps of: accepting an input of binary image data; performing pattern matching on the image data with a pattern for detecting a jaggy portion; if a pattern of any portion of the image data matches the aforementioned pattern, converting the image data into multivalued image data by substituting a jaggy portion that is the matching portion with a grayscale; generating an attribute code indicative of an attribute for each region of the multivalued image data; converting a resolution of the multivalued image data into a resolution higher than that resolution; converting a resolution of the attribute code into a resolution equal to the converted resolution of the image data; and binarizing the image data having the converted resolution by a binarization method according to the attribute code having the converted resolution.

In accordance with a further aspect of the present invention, a medium has a program recorded thereon for causing a computer to execute a resolution conversion process of converting a resolution of image data. The program causes the computer to execute the steps of: accepting an input of binary image data; performing pattern matching on the image data with a pattern for detecting a jaggy portion; if a pattern of any portion of the image data matches the aforementioned pattern, converting the image data into multivalued image data by substituting a jaggy portion that is the matching portion with a grayscale; generating an attribute code indicative of an attribute for each region of the multivalued image data; converting a resolution of the multivalued image data into a resolution higher than that resolution; converting a resolution of the attribute code into a resolution equal to the converted resolution of the image data; and binarizing the image data having the converted resolution by a binarization method according to the attribute code having the converted resolution.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6A to FIG. 6H, FIG. 7A to FIG. 7H, FIG. 8A to FIG. 8H, and FIG. 9A to FIG. 9H show specific examples of matching filters each representing a dot pattern to be corrected.

FIG. 11A to FIG. 11C illustrate generation of a region identification attribute code.

FIG. 12 shows a specific example of a re-binarization processing method for each attribute signal.

FIG. 13 and FIG. 14 illustrate resolution conversion employing a conventional technique.

FIG. 15 illustrates resolution conversion in MFP in accordance with an embodiment.

DESCRIPTION OF THE PREFERRED EMBODIMENTS

Figure 1:
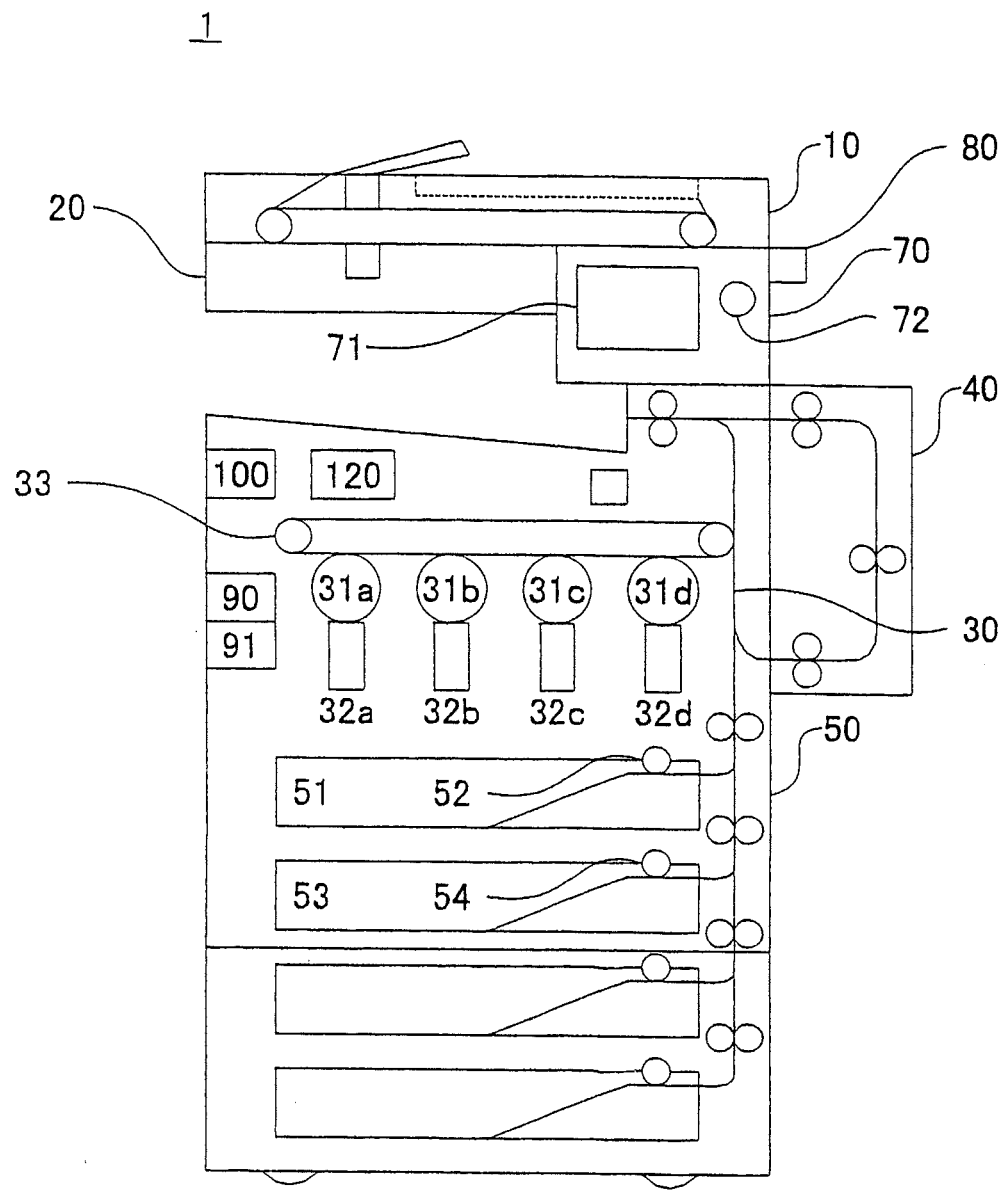
FIG. 1 shows a specific example of an overall configuration of MFP in accordance with an embodiment.

In the following, an embodiment of the present invention will be described with reference to the drawings. In the following description, the same parts and components are denoted with the same reference characters. Their designations and functions are also the same.

Referring to FIG. 1, MFP (Multi Function Peripheral) 1 in accordance with an embodiment includes an automatic document feeder 10, a scan unit 20, a formation unit 30 for forming an image, a paper-feeding unit 50, an operation panel 70, a facsimile unit 90, a communication interface (I/F) unit 91, a control unit 100, and an HDD (Hard Disk Drive) 120.

Automatic document feeder 10 automatically transfers a plurality of original documents set on a document feeding tray one by one to a prescribed document scanning position set on a platen glass included in scan unit 20.

Scan unit 20 scans a document image according to the size of the document arranged at the document scanning position on the platen glass. Scan unit 20 converts reflected light obtained by scanning the surface of the document image into an electrical signal thereby obtaining image data. The obtained image data is input to control unit 100.

The configuration and operation used in usual image forming apparatuses may be employed as those of automatic document feeder 10 and scan unit 20.

Operation panel 70 is a user interface. Operation panel 70 includes a touch panel input unit 71, a key input unit 72, and a sub-power supply switch 80. Sub-power supply switch 80 is a switch for the user to directly designate shifting to a sleep mode that is a power-saving operation mode.

Facsimile unit 90 is an interface connecting to a public telephone line for receiving/sending image data. Facsimile unit 90 receives image data transmitted via the public telephone line to output the received image data to control unit 100.

Control unit 100 includes a CPU (Central Processing Unit). Control unit 100 executes a prescribed program and outputs a control signal to each unit to perform the processing as follows. Specifically, control unit 100 performs image processing on the image data input from scan unit 20 or facsimile unit 90 and thereafter reads the processed data for each main scanning line in synchronization with feeding of printing paper to output to formation unit 30 a signal for driving a laser diode. Furthermore, control unit 100 outputs image data to HDD 120 for storage. HDD 120 stores the image data sent from control unit 100.

Formation unit 30 forms a color image by electrophotography. Formation unit 30 includes photosensitive drums 31a, 31b, 31c, 31d (representatively referred to as photosensitive drum 31) and exposure scanning units 32a, 32b, 32c, 32d (representatively referred to as exposure scan unit 32) corresponding to yellow, magenta, cyan, and black, respectively, and a transfer belt 33.

Photosensitive drum 31 is scanned and exposed with laser light generated by exposure scanning unit 32 based on a drive signal from control unit 100. Transfer belt 33 overlays all the toner images on photosensitive drum 31 corresponding to the respective colors and then transfers the overlaid images onto paper sent from paper-feeding unit 50.

Paper-feeding unit 50 includes paper-feeding cassettes 51, 53 for storing paper and pick-up rollers 52, 54 for letting out paper from each of paper-feeding cassettes 51, 53 in order to supply formation unit 30 with paper.

Figure 2:
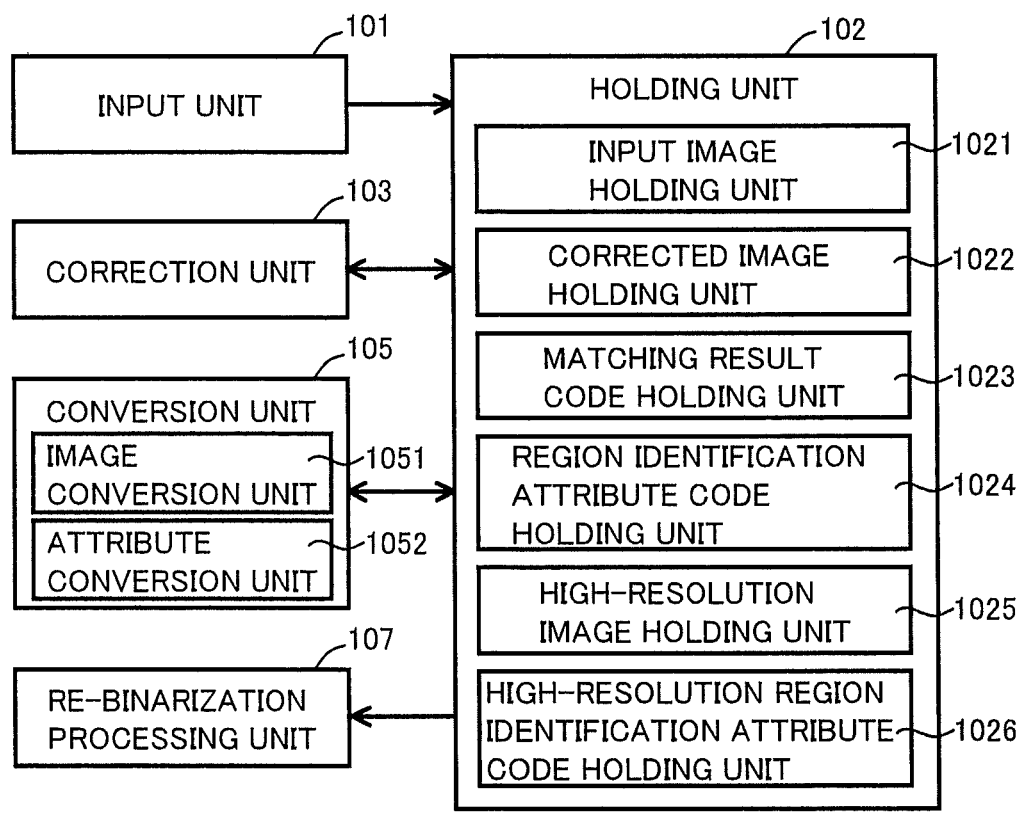
FIG. 2 is a block diagram showing a functional configuration of a control unit of MFP for executing a process of enhancing the resolution of image data input from a facsimile unit.

Referring to FIG. 2, a functional configuration of control unit 100 for executing a process of enhancing the resolution of image data input from facsimile unit 90 in control unit 100 will be described. Each of the shown functions is formed mainly in CPU by a not-shown CPU included in control unit 100 executing a prescribed program. Alternatively, the functions may be formed by a hardware configuration included in control unit 100 or a hardware configuration other than control unit 100, or they may be formed by a combination thereof.

Referring to FIG. 2, the above-noted functions include an input unit 101 for accepting an input of image data, a correction unit 103, a conversion unit 105 for converting a resolution, and a re-binarization processing unit 107. Conversion unit 105 farther includes an image conversion unit 1051 and an attribute conversion unit 1052.

Figure 3:
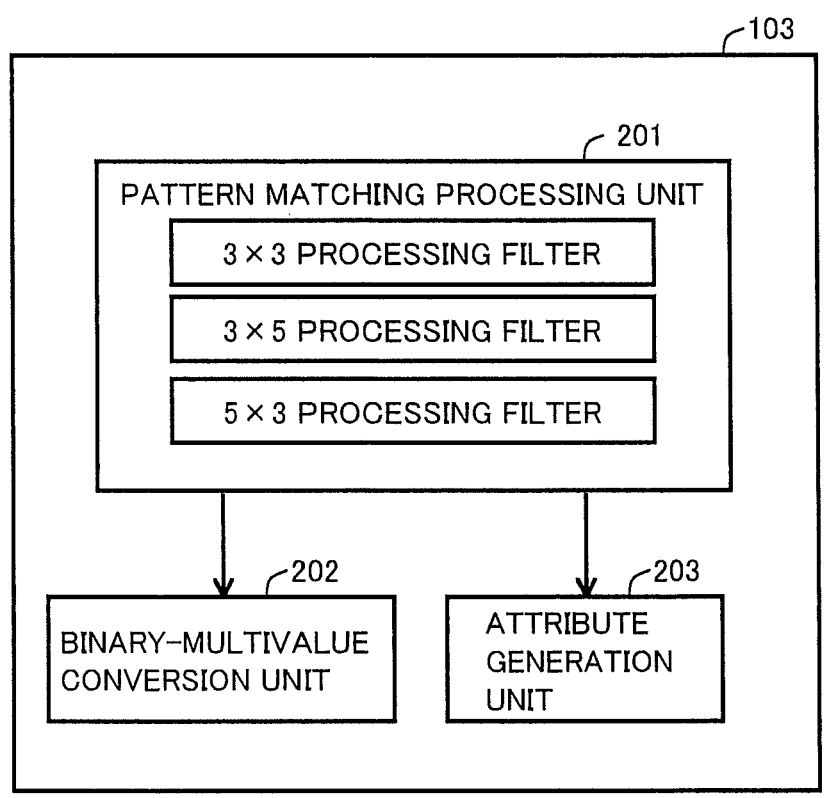
FIG. 3 is a block diagram showing a specific example of a detailed configuration of a correction unit depicted in FIG. 2.

Correction unit 103 includes, as shown in FIG. 3, a pattern matching processing unit 201, a binary-multivalue conversion unit 202, and an attribute generation unit 203. Pattern matching processing unit 201 stores a matching filter having a size corresponding to a dot size of a matching process for use in a pattern matching process.

A holding unit 102 refers to a storage region mainly formed of a storage device such as HDD 120. Holding unit 102 includes an input image holding unit 1021 that is a region for holding image data (also referred to as input image data hereinafter) input at input unit 101, a corrected image holding unit 1022 holding image data (also referred to as corrected image data hereinafter) corrected through a process in correction unit 103 as described later, a matching result code holding unit 1023 that is a region for holding information (referred to as a matching process result code) indicating a result of a matching process in pattern matching processing unit 201, a region identification attribute code holding unit 1024 that is a region for holding a region identification attribute code generated through a process described later, a high-resolution image holding unit 1025 that is a region for holding image data (also referred to as high-resolution image data hereinafter) having a resolution enhanced in image conversion unit 1051, and a high-resolution region identification attribute code holding unit 1026 that is a region for holding a region identification attribute code (also referred to as a high-resolution region identification attribute code hereinafter) having a resolution enhanced in attribute conversion unit 1052.

Input unit 101 accepts an input of binary image data at a low resolution from facsimile unit 90. Data input unit 101 stores the input image data into input image holding unit 1021.

Pattern matching processing unit 201 included in correction unit 103 executes a matching process on the input image data held in input image holding unit 1021, using a matching filter. The result of the matching process is output to binary-multivalue conversion unit 202 and attribute generation unit 203.

Binary-multivalue conversion unit 202 performs jaggy correction of converting a display tone of a correction target dot, which is a dot to be corrected, into a grayscale, according to the result of the matching process, and further performs a process of converting a dot other than the correction target dot of the input image data into a multivalued dot. Binary-multivalue conversion unit 202 stores the corrected image data, which is multivalued image data, into corrected image holding unit 1022.

Attribute generation unit 203 generates a matching process result code for storage into matching result code holding unit 1023. Attribute generation unit 203 additionally generates a region identification attribute code as described later using the input image data held in input image holding unit 1021 and the matching process result code held in matching result code holding unit 1023 and stores the generated region identification attribute code into region identification attribute code holding unit 1024.

Image conversion unit 1051 included in conversion unit 105 enhances the resolution of corrected image data by executing a resolution conversion on the corrected image data held in corrected image holding unit 1022 using an interpolation conversion technique such as bicubic interpolation. Attribute conversion unit 1052 enhances the resolution of the region identification attribute code by executing a resolution conversion on the region identification attribute code held in region identification attribute code holding unit 1024 using a conversion technique without interpolation or such a conversion technique as nearest neighbor interpolation. The generated high-resolution image data and high-resolution region identification attribute code are stored into high-resolution image holding unit 1025 and high-resolution region identification attribute code holding unit 1026, respectively.

Re-binarization processing unit 107 stores beforehand a re-binarization processing method for each region identification attribute code. Re-binarization processing unit 107 reads the high-resolution region identification attribute code held in high-resolution region identification attribute code holding unit 1026 and the high-resolution image data held in high-resolution image holding unit 1025 and performs a re-binarization process for the image data by employing a re-binarization processing method corresponding to that region identification attribute code.

Figure 4:
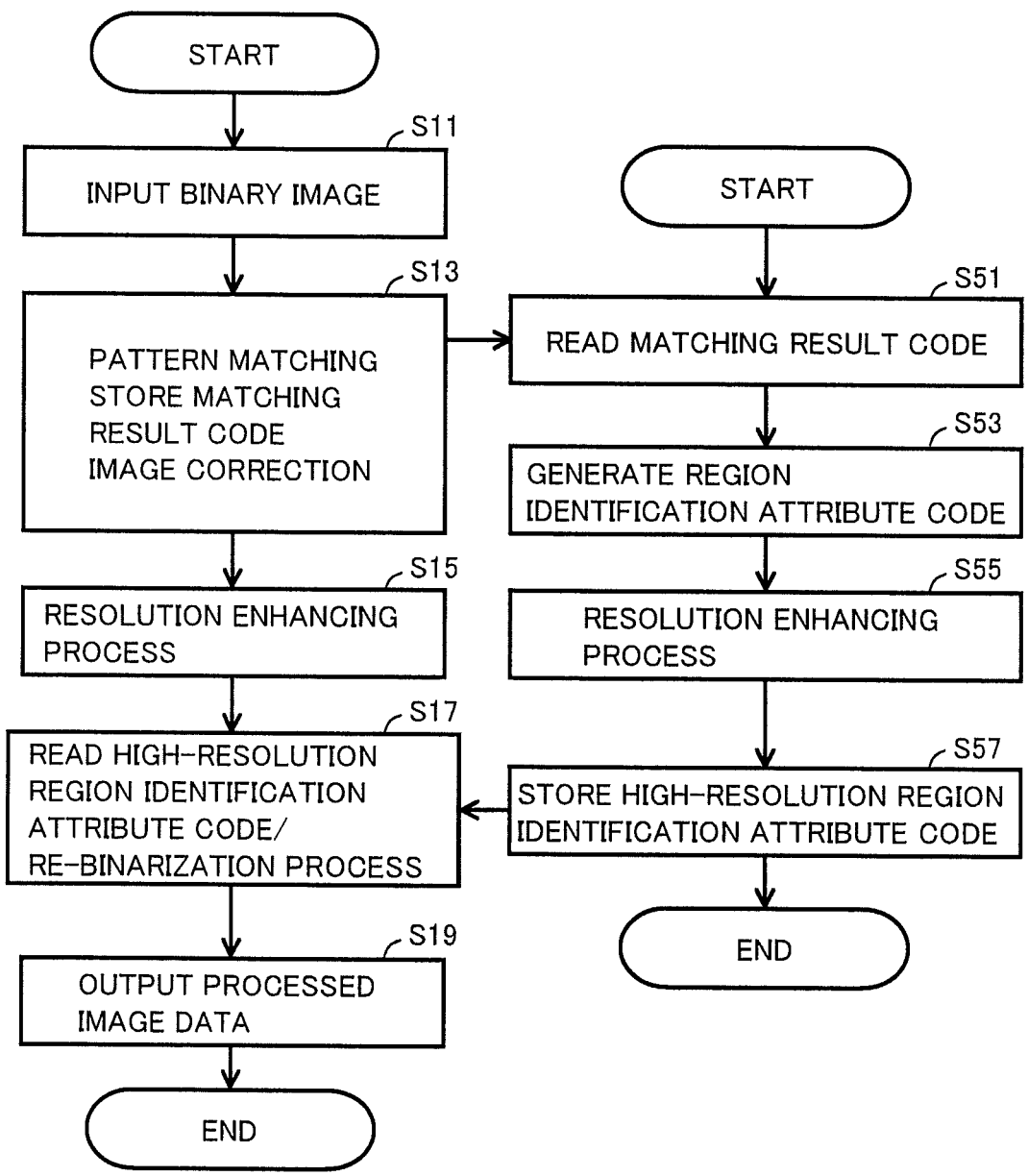
FIG. 4 is a flowchart showing a specific flow of a process executed in MFP.

Using FIG. 4, a flow of a process executed in MFP 1 for enhancing the resolution of low-resolution binary input image data from facsimile unit 90 and outputting the enhanced image data will be described. The process shown in FIG. 4 is realized by a not-shown CPU included in control unit 100 executing a prescribed program to allow each function shown in FIG. 2 and FIG. 3 to function. The flowchart on the left in FIG. 4 shows a flow of processing image data in MFP 1 and the flowchart on the right in FIG. 4 shows a flow of a process of generating a region identification attribute code as described later. These processes are independently executed by mutually exchanging required data as necessary and each using information held in holding unit 102.

Referring to FIG. 4, in processing image data, in step S11, input unit 101 accepts an input of low-resolution image data from facsimile unit 90 and stores the same in input image holding unit 1021. In step S13, pattern matching processing unit 201 of correction unit 103 performs a matching process on the input image data held in input image holding unit 1021 using a filter and generates a matching process result code as a process result for storage into matching result code holding unit 1023. Binary-multivalue conversion unit 202 then converts the binary image data held in input image holding unit 1021 into multivalued image data. At that time, binary-multivalue conversion unit 202 performs jaggy correction of converting a correction target dot, according to the matching result. Correction unit 103 then stores the multivalued, corrected image data into corrected image holding unit 1022. In step S15, image conversion unit 1051 of conversion unit 105 enhances the resolution of the corrected image data by converting the resolution of corrected image data held in corrected image holding unit 1022 and then stores the enhanced, corrected image data into high-resolution image holding unit 1025.

On the part of the region identification attribute code generating process, attribute generation unit 203 of correction unit 103 reads the matching process result code stored in matching result code holding unit 1023 in step S13 as described above, in step S51, and generates a region identification attribute code using the input image data held in input image data holding unit 1021 and the matching process result code, in step S53. Attribute generation unit 203 stores the generated region identification attribute code into region identification attribute code holding unit 1024. In step S55, attribute conversion unit 1052 of conversion unit 105 enhances the resolution of the region identification attribute code by converting the resolution of the region identification attribute code held in region identification attribute code holding unit 1024 into a resolution equal to the resolution of the high-resolution image data in step S15, and stores the enhanced region identification attribute code into high-resolution region identification attribute code holding unit 1026.

In the image data processing, re-binarization processing unit 107 reads the high-resolution region identification attribute code stored in high-resolution region identification attribute code holding unit 1026 in step S55 as described above for executing a process of binarizing once again the high-resolution image data that is a multivalued image held in high-resolution image holding unit 1025, in step S17, and outputs the processed image data in step S19.

Using FIG. 5, a flow of pattern matching, generation of a matching process result code, and an image correction process in step S13 as mentioned above will be described.

Figure 5:
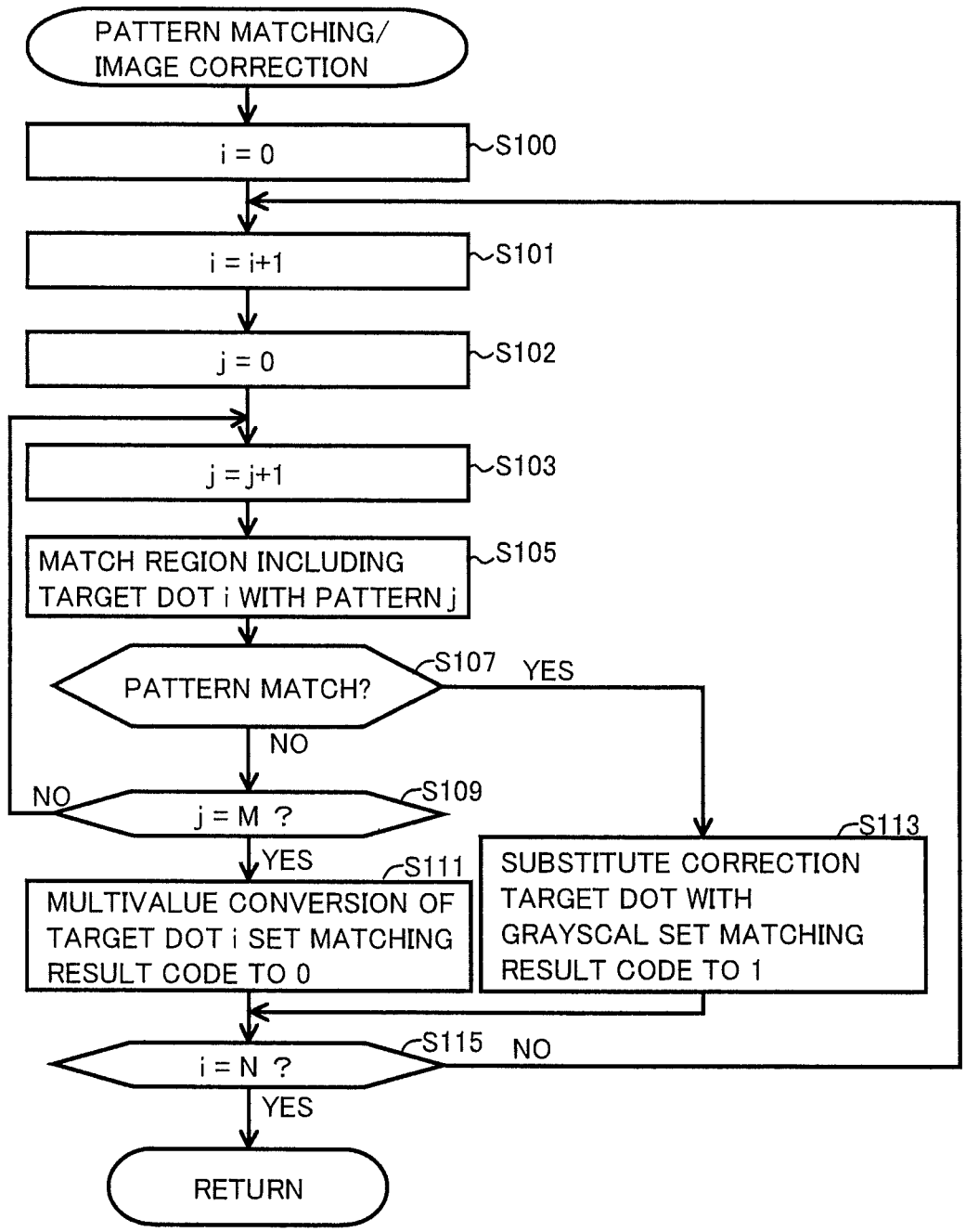
FIG. 5 is a flowchart showing a specific flow of a process, among the processes executed in MFP, of performing pattern matching for low-resolution input image data for performing jaggy correction based on the result.

Referring to FIG. 5, CPU initializes a variable i representing a target dot of the input image data at the time of matching in step S100, and thereafter increments variable i by one in step S101 for executing the subsequent process in which that region of the input image data which includes a dot corresponding to variable i is set as a region to be matched. CPU also initializes a variable j representing a matching filter for use in pattern matching, in step S102, and thereafter increments variable j by one in step S103, so that a matching filter corresponding to variable j is used in the subsequent pattern matching.

In step S105, pattern matching processing unit 201 performs a matching process for a region in the input image data including a target dot corresponding to variable i, using a matching filter corresponding to variable j.

More specifically, FIG. 6A to FIG. 6D and FIG. 8A to FIG. 8D show specific examples of matching filters each having a matrix size of 3×3 dots in a matching process. FIG. 7A to FIG. 7D show specific examples of matching filters each having a matrix size of 3×5 dots in a matching process. FIG. 9A to FIG. 9D show specific examples of matching filters each having a matrix size of 5×3 dots in a matching process. The matching filter in each figure is used to detect that, in the region to be matched, dots at a solidly shaded part are black and dots not shaded are white. Accordingly, the matching filters in FIG. 6A to FIG. 6D and FIG. 7A to FIG. 7D are used to detect a jaggy part in the horizontal direction of the input image data, and the matching filters in FIG. 8A to FIG. 8D and FIG. 9A to FIG. 9D are used to detect a jaggy part in the vertical direction of the input image data. Besides the examples shown in FIG. 6A to FIG. 9D, other patterns of matching filters, such as resolution, dot arrangements or reversed black-and-white, may be contemplated. Pattern matching processing unit 201 stores M matching filters and performs a pattern matching process using them one by one in order.

As a result of the matching process in step S105, if there is a pattern match between the matching filter corresponding to variable j and the region including the target dot corresponding to variable i (YES in step S107), in step S113, binary-multivalue conversion unit 202 performs jaggy correction in which a tone value of a correction target dot in the region including the target dot corresponding to variable i is substituted with a grayscale as defined beforehand (for example, 128-level grayscale). In addition, in step S113, attribute generation unit 203 sets that value in matching result code holding unit 1023, which corresponds to the input image data to be processed, for the position corresponding to the correction target dot in the region including the target dot corresponding to variable i, to a value corresponding to black, as a matching result in the foregoing step S105. Here, the value corresponding to black is set to "1" and the value corresponding to white is set to "0," and in step S113, the value in matching result code holding unit 1023 for that position is set to "1."

As a result of the matching process in step S105, if there is no pattern match between the matching filter corresponding to variable j and the region corresponding to variable i (NO in step S107), when variable j representing the matching filter to be used does not reach the maximum number M of the stored matching filters (NO in step S109), that is, when there exists any matching filter that has not yet been used in the pattern matching process, CPU returns the process to step S103 and increments variable j by one. Accordingly, the pattern matching process is performed again using the next matching filter for the region including the target dot corresponding to variable i.

As a result of performing the pattern matching process using the matching filters in order until the maximum number M of matching filters is reached, if the pattern of the region including the target dot corresponding to variable i does not match any matching filter (YES in step S109), in step S111, binary-multivalue conversion unit 202 converts the target dot corresponding to variable i into a multivalued dot. In addition, attribute generation unit 203 sets the value in matching result code holding unit 1023 for the position corresponding to the target dot, to "0", as a matching result in the aforementioned step S107.

As a result of performing the pattern matching process using the matching filters in order until the maximum number M of matching filters is reached, if the pattern of the region including the target dot corresponding to variable i matches any one of matching filters (YES in step S107), the pattern matching process for that region is ended at that moment. Then, in step S113, binary-multivalue conversion unit 202 substitutes the tone value of the correction target dot in the region to be matched for the position defined by the pattern-matched matching filter corresponding to variable j, with a grayscale such as 128-level grayscale. Furthermore, attribute generation unit 203 sets the value in matching result code holding unit 1023 for the position corresponding to the correction target dot, to "1."

The above-noted correction target dot refers to that dot in a region to be matched which corresponds to a predetermined dot position in each matching filter. Specifically, in each of the matching filters in FIG. 6A to FIG. 6D, FIG. 7A to FIG. 7D, FIG. 8A to FIG. 8D, and FIG. 9A to FIG. 9D, each of the dot positions as hatched with oblique lines in FIG. 6E to FIG. 6H, FIG. 7E to FIG. 7H, FIG. 8E to FIG. 8H, and FIG. 9E to FIG. 9H is the position of the correction target dot.

Figures 6A, 6B, 6C, 6D:
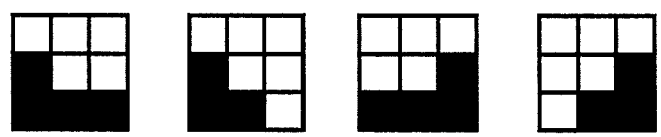
Figures 6E, 6F, 6G, 6H:
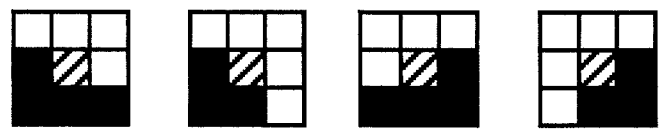
Figure 7A:
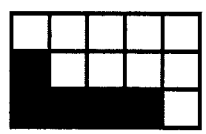
Figure 7B:
Figure 7C:
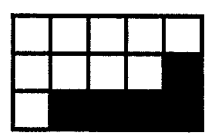
Figure 7D:
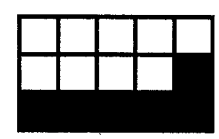
Figure 7E:
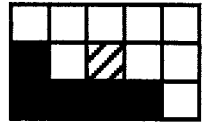
Figure 7F:
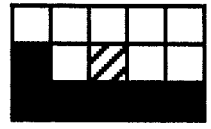
Figure 7G:
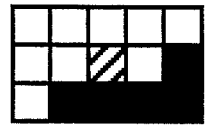
Figure 7H:
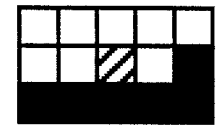
Figure 9A:
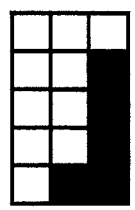
Figure 9B:
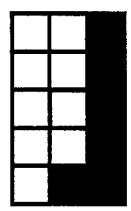
Figure 9C:
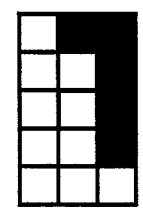
Figure 9D:
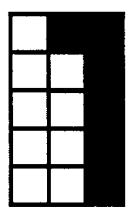
Figure 9E:
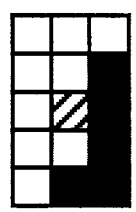
Figure 9F:
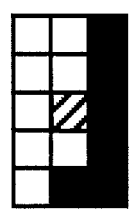
Figure 9G:
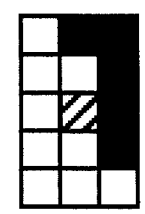
Figure 9H:
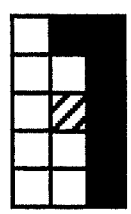
Figure 10A:
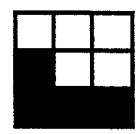
FIG. 10A and FIG. 10B illustrate specific examples of multivalue conversion.
Figure 10B:
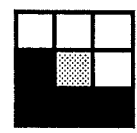

For example, a region to be matched including a target dot corresponding to variable i is configured as shown in FIG. 10A. The value of each dot in the region shown in FIG. 10A of the image data is represented as in FIG. 11A. As a result of the pattern matching process in the aforementioned step S105, the region in FIG. 10A has a pattern that matches the pattern of the matching filter in FIG. 6A. For the matching filter in FIG. 6A, the middle dot at a dot position hatched with oblique lines in FIG. 6E is defined as a correction target dot. Then, in the aforementioned step S111, binary-multivalue conversion unit 202 substitutes the tone value of the middle dot that is a correction target dot in that region with a grayscale having a tone value defined beforehand, as shown in FIG. 10B. Furthermore, in the aforementioned step S113, attribute generation unit 203 sets the value in matching result code holding unit 1023 for the position of the middle dot that is the correction target dot in that region, to "1", as shown in FIG. 11B.

Upon completion of the process above, CPU returns the process to step S101, if variable i representing the target dot in the input image data does not reach a value N representing the final dot of the input image data (NO in step S115), that is, if there exists any region that has not yet been subjected to the pattern matching process in the input image data. CPU then increments variable i by one and performs the aforementioned pattern matching process on the region including the next target dot.

When the pattern matching process is completed for all the regions of the input image data, that is, when variable i representing the target dot of the input image data reaches value N representing the final dot of the input image data (YES in step S115), CPU ends a series of processes and returns the process to step S15.

As a result of performing the process above using the stored matching filters in order for all the regions of the input image data, it is assumed that a matching process result code as shown in FIG. 11B is obtained as a matching result for the region represented in FIG. 11A of the input image data. Here, in the aforementioned step S53 in the region identification attribute code generating process, attribute generation unit 203 generates, from the input image data in FIG. 11A and the matching process result code in FIG. 11B, a region identification attribute code which is an attribute code for identifying whether jaggy correction is made or not based on the matching result of that region. Specifically, in the aforementioned step S53, attribute generation unit 203 generates a region identification attribute code (FIG. 11C) by combining the input image data in FIG. 11A with the matching process result code in FIG. 11B. For each dot of the corrected image data, the generated region identification attribute code shows information as to whether the original binary image data before correction is black or white and information as to whether jaggy correction is made or not on the dot.

In the aforementioned step S15, image conversion unit 1051 executes a resolution conversion on the image data corrected in the aforementioned step S13 as shown in FIG. 5 using a conversion technique with interpolation such as bicubic interpolation thereby converting the resolution into a high resolution for printing as defined beforehand. In the aforementioned step S55, attribute conversion unit 1052 executes a resolution conversion on the region identification attribute code generated from the input image data and the matching process result code generated as a result of performing the process in FIG. 5 on all the regions of the input image data, using a conversion technique without interpolation or such a conversion technique as nearest neighbor interpolation, thereby converting the resolution into a high resolution equal to that of the high-resolution image data.

In step S17, re-binarization processing unit 107 performs a re-binarization process on the image data having the resolution enhanced in step S15 by employing a re-binarization processing method corresponding to the region identification attribute code having the resolution enhanced to the same resolution in step S55. Re-binarization processing unit 107 stores a binarization method for each region identification attribute code, as a re-binarization processing method. According to this binarization method, a dot that was a white dot in the original binary image data is likely to be a white dot in re-binarization and a dot that was a black dot is likely to be a black dot in re-binarization. On the other hand, a dot that was converted by jaggy correction from a black dot into a white dot in binary image data is less likely to be a white dot through re-binarization than an originally white dot that is not subjected to jaggy correction, and a dot that was converted by jaggy correction from a white dot into a black dot in binary image data is less likely to be a black dot through re-binarization than an originally black dot that is not subjected to jaggy correction. A dot subjected to jaggy correction is equivalent to a dot substituted with a grayscale by binary-multivalue conversion unit 202 in the aforementioned step S111.

The re-binarization processing method for each region identification attribute code in FIG. 12 is stored beforehand in re-binarization processing unit 107.

More specifically, referring to FIG. 12, an attribute signal "00" represents a dot that is a white dot in an input image and not subjected to jaggy correction by attribute generation unit 203. Defined as a binarization method corresponding to attribute signal "00" is a binarization method that makes the dot less likely to be converted into a black dot, that is, a binarization method using a higher threshold value T1 as a threshold value T for determining whether to convert the dot into a white dot or a black dot. Threshold value T1 is, for example, about 150-level grayscale.

An attribute "01" represents a dot that is a black dot in an input image and subjected to jaggy correction by attribute generation unit 203. Defined as a binarization method corresponding to attribute "01" is a binarization method that converts the dot into a black dot in a normal way, that is, a binarization method using a normal threshold value T2 as a threshold value T for determining whether to convert the dot into a white dot or a black dot. Threshold value T2 is, for example, about 125-level grayscale.

An attribute "10" represents a dot that is a black dot in an input image and not subjected to jaggy correction by attribute generation unit 203. Defined as a binarization method corresponding to attribute "10" is a binarization method that makes the dot less likely to be converted into a white dot, that is, a binarization method using a lower threshold value T3 as a threshold value T for determining whether to convert the dot into a white dot or a black dot. Threshold value T3 is, for example, about 100-level grayscale.

An attribute "11" represents a dot that is a white dot in an input image and subjected to jaggy correction by attribute generation unit 203. Defined as a binarization method corresponding to attribute "11" is a binarization method that converts the dot into a white dot in a normal way, that is, a binarization method using a normal threshold value T2 as a threshold value T for determining whether to convert the dot into a white dot or a black dot.

In the aforementioned step S17, re-binarization processing unit 107 selects the corresponding method for each dot of the image data from among the stored binarization methods shown in FIG. 12, based on the value for the dot position of the region identification attribute code held in region identification attribute code holding unit 1024 and then performs a binarization process by that method.

The resolution conversion process as mentioned above in MFP 1 can prevent jaggies that happen when low-resolution input image data is converted into high-resolution image data for printing.

Figure 13:
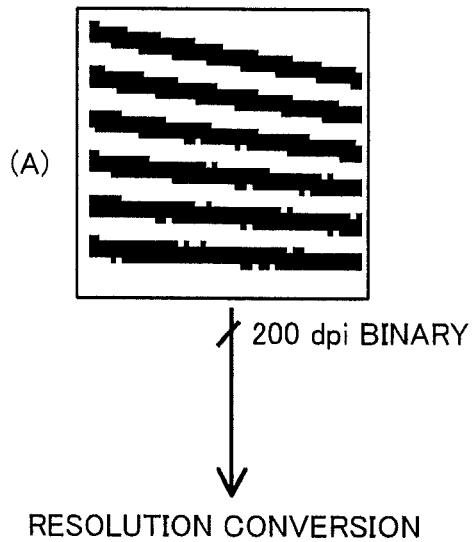

Using FIG. 13 to FIG. 15, the difference between the result of resolution conversion by a conventional method and the result of resolution conversion by the method according to the present embodiment will be described. In FIG. 13, (A) to (C) show the result obtained by the present inventor performing a resolution conversion without jaggy correction by employing a conventional technique. FIG. 14 shows the result obtained by the present inventor performing a resolution conversion with jaggy correction by employing a conventional technique. FIG. 15 shows the result obtained by the present inventor performing a resolution conversion by employing the foregoing technique in accordance with the present embodiment. FIG. 13(A), FIG. 14(A), and FIG. 15(A) show specific examples of the same input image data, for example, show low-resolution binary image data such as image data received by facsimile. The resolution is 200 dpi. The high resolution for printing is, for example, 600 dpi.

In the conventional resolution conversion without jaggy correction, as shown in FIG. 13, binary image data (A) at 200 dpi is resolution-converted into multivalued image data at 600 dpi (B) and is then subjected to a binarization process once again (C). In this method, as shown by (C), the jaggies present in the low-resolution binary image data are left in the high-resolution image data as they are, thereby deteriorating the quality of the output image.

In the conventional resolution conversion with jaggy correction, as shown in FIG. 14, binary image data (A) at 200 dpi is subjected to jaggy correction (B), then resolution-converted into multivalued image data at 600 dpi (C), and then subjected to a binarization process once again (D). In the low-resolution image data, the proportion of jaggies that depend on the size of the dots themselves is high. Therefore, as shown in (B), even though jaggy correction is made at the low-resolution stage, the jaggies still remain in the image data. In this method, when image data after jaggy correction is binarized again, a uniform threshold value for the image data is used to determine whether to convert a dot into a white dot or a black dot, and the binarization is performed based on the determination. Therefore, jaggies remaining in the low-resolution image data after jaggy correction are left in the high-resolution image data as they are, thereby deteriorating the quality of the output image.

By contrast, in the foregoing resolution conversion performed in MFP 1 in accordance with the present embodiment, as shown in FIG. 15, binary image data at 200 dpi (A) is subjected to jaggy correction (B) and then resolution-converted into multivalued image data at 600 dpi (C) while the region identification attribute code made of the tone value of each dot and an attribute representing whether jaggy correction is made or not is also converted in accordance with the resolution conversion of the image data (D). Then, whether jaggy correction is made or not is determined based on the converted region identification attribute code, so that a binarization process is performed on the multivalued image data at 600 dpi according to the determination (E). In the resolution conversion process in accordance with the present embodiment, at a time of the re-binarization process, whether to make a tone conversion or not in the re-binarization process is determined by a higher threshold value for the dot that is grayscaled in the multivalued image data by jaggy correction, as compared with the dot that has the same tone value in the input binary image data but is not subjected to jaggy correction. In other words, a binarization process is performed in such a manner that a dot subjected to jaggy correction is less likely to be tone-converted than a dot not subjected to jaggy correction. Accordingly, in this method, even when jaggies still remain in the multivalued image data that has been converted into high-resolution image data, re-binarization is executed in consideration of whether jaggy correction is made or not, thereby suppressing jaggies in the re-binarized image data. It is obvious that the image data (E) in FIG. 15 after re-binarization in the resolution conversion process in the present embodiment has jaggies significantly reduced, as compared with the image data after the conventional re-binarization as represented by (C) in FIG. 13 and (D) in FIG. 14.

Furthermore, a program causing a computer to execute the resolution conversion process in MFP 1 as described above may also be provided. Such a program may be recorded in a computer readable medium such as a flexible disk, a CD-ROM (Compact Disk-Read Only Memory), a ROM (Read Only Memory), a RAM (Random Access Memory), and a memory card and be provided as a program product. Alternatively, the program may be recorded in a recording medium such as a hard disk contained in a computer. Alternatively, the program may be downloaded via a network.

The program may allow the process to be executed by invoking necessary modules, among program modules provided as a part of Operation System (OS) of a computer, in a prescribed sequence at a prescribed timing. In this case, the aforementioned modules are not included in the program itself and the process is executed in cooperation with OS. The program may also include such a program that does not include modules.

Furthermore, the program may be built in a part of another program. In this case, the modules included in another program are not included in the program itself, and the process is executed in cooperation with another program. The program may also include such a program built in another program.

The program product to be provided is installed in a program storage unit such as a hard disk for execution. It is noted that the program product includes the program itself and a recording medium having the program recorded thereon.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image forming apparatus comprising:
an input device for inputting at least binary image data; and
a controller configured to control operations of said image forming apparatus on binary image data input by said input device for
i) performing pattern matching on said binary image data to (1) detect a jaggy portion and (2) reduce jaggies by converting said binary image data into multivalued corrected image data and substituting said jaggy portion with a grayscale,
ii) converting a resolution of said multivalued corrected image data into a higher resolution,
iii) generating an attribute code, that at least indicates if jaggy correction occurred for each region of said multivalued corrected image data, and converting a resolution of said attribute code into a resolution equal to the converted resolution of said multivalued corrected image data, and
iv) binarizing said multivalued corrected image data having the converted resolution by a binarization method according to said attribute code having the converted resolution.

2. The image forming apparatus according to claim 1, wherein through control of said controller, said attribute code is generated based on a result of said pattern matching.

3. The image forming apparatus according to claim 1, wherein through control of said controller, said attribute code is generated by combining a value representing a tone of said image data with a result of said pattern matching.

4. The image forming apparatus according to claim 1, wherein through control of said controller, said multivalued corrected image data having said converted resolution is binarized for each position using a threshold value according to said attribute code having the converted resolution and corresponding to said each position.

5. The image forming apparatus according to claim 1, wherein
through control of said controller,
said attribute code is generated based on a value representing a tone of said image data and a result of said pattern matching, and
said multivalued corrected image data having the converted resolution is binarized for each position using a threshold value according to a tone of said each position of input said image data and whether or not said each position is detected to be the jaggy portion and is then subjected to said correction.

6. The image forming apparatus according to claim 1, wherein
through control of said controller,
the resolution of said multivalued corrected image data is converted by a first conversion method in which the resolution is enhanced by interpolation, and
the resolution of said attribute code is converted by a second conversion method, different from said first conversion method, in which the resolution is enhanced without interpolation or by interpolation with a lower accuracy than said first conversion method.

7. The image forming apparatus according to claim 1, further comprising a printer, wherein
said input device is a facsimile machine, and
through control of said controller, a resolution of said binary image data received by said facsimile machine is converted into a resolution, higher than said resolution of said binary image data, for printing by said printer.

8. An image processing method comprising the steps of:
accepting an input of binary image data;
performing pattern matching on said binary image data with a pattern for detecting a jaggy portion;
if a pattern of any portion of said binary image data matches said pattern, converting said binary image data into multivalued corrected image data and substituting the jaggy portion, corresponding to said matching portion, with a grayscale;
generating an attribute code that at least indicates if jaggy correction occurred for each region of said multivalued corrected image data;
converting a resolution of said multivalued corrected image data into a higher resolution;
converting a resolution of said attribute code into a resolution equal to the converted resolution of said multivalued corrected image data; and
binarizing said multivalued corrected image data having the converted resolution by a binarization method according to said attribute code having the converted resolution.

9. The image processing method according to claim 8, wherein in said step of generating the attribute code, said attribute code is generated based on a result of said pattern matching.

10. The image processing method according to claim 8, wherein in said step of generating the attribute code, said attribute code is generated by combining a value representing a tone of said image data with a result of said pattern matching.

11. The image processing method according to claim 8, wherein in said step of binarizing, said multivalued corrected image data having said converted resolution is binarized for each position using a threshold value according to said attribute code having the converted resolution and corresponding to said each position.

12. The image processing method according to claim 8, wherein
in said step of generating the attribute code, said attribute code is generated based on a value representing a tone of said image data and a result of said pattern matching, and
in said step of binarizing, said multivalued corrected image data having the converted resolution is binarized for each position using a threshold value according to a tone of said each position of input said image data and whether or not said each position is detected to be a jaggy portion and is then subjected to said correction.

13. The image processing method according to claim 8, wherein
in said step of converting the resolution of said multivalued corrected image data, a first conversion method is used in which the resolution is enhanced by interpolation, and
in said step of converting the resolution of said attribute code, a second conversion method, different from said first conversion method, is used in which the resolution is enhanced without interpolation or by interpolation with a lower accuracy than said first conversion method.

14. The image processing method according to claim 8, wherein
in said step of accepting the input of binary image data, the input of said binary image data is accepted through reception by a facsimile machine, and
said step of converting the resolution of said multivalued corrected image data further includes converting a resolution of said binary image data, received by said facsimile machine, into a resolution, higher than said resolution of said binary image data, for printing by a printer.

15. A non-transitory computer readable medium having a program recorded thereon for causing a computer to execute a resolution conversion process of converting a resolution of image data, said program causing said computer to execute the steps of:
accepting an input of binary image data;
performing pattern matching on said binary image data with a pattern for detecting a jaggy portion;
if a pattern of any portion of said binary image data matches said pattern for detecting a the jaggy portion, converting said binary image data into multivalued corrected image data and substituting the jaggy portion, corresponding to said matching portion, with a grayscale;
generating an attribute code that at least indicates if jaggy correction occurred for each region of said multivalued corrected image data;
converting a resolution of said multivalued corrected image data into a higher resolution;
converting a resolution of said attribute code into a resolution equal to the converted resolution of said multivalued corrected image data; and
binarizing said multivalued corrected image data having the converted resolution by a binarization method according to said attribute code having the converted resolution.

16. The non-transitory computer readable medium according to claim 15, wherein in said step of generating the attribute code, said attribute code is generated based on a result of said pattern matching.

17. The non-transitory computer readable medium according to claim 15, wherein in said step of generating attribute code, said attribute code is generated by combining a value representing a tone of said image data with a result of said pattern matching.

18. The non-transitory computer readable medium according to claim 15, wherein in said step of binarizing, said multivalued corrected image data having said converted resolution is binarized for each position using a threshold value according to said attribute code having the converted resolution and corresponding to said each position.

19. The non-transitory computer readable medium according to claim 15, wherein
in said step of generating the attribute code, said attribute code is generated based on a value representing a tone of said image data and a result of said pattern matching, and
in said step of binarizing, said multivalued corrected image data having the converted resolution is binarized for each position using a threshold value according to a tone of said each position of input said image data and whether or not said each position is detected to be the jaggy portion and is then subjected to said correction.

20. The non-transitory computer readable medium according to claim 15, wherein
in said step of converting the resolution of said multivalued corrected image data, a first conversion method is used in which the resolution is enhanced by interpolation, and
in said step of converting the resolution of said attribute code, a second conversion method, different from said first conversion method, is used in which the resolution is enhanced without interpolation or by interpolation with a lower accuracy than said first conversion method.

21. The non-transitory computer readable medium according to claim 15, wherein
in said step of accepting the input of said binary image data, the input of said binary image data is accepted through reception by a facsimile machine, and
said step of converting the resolution of said multivalued corrected image data further includes converting a resolution of said binary image data, received by said facsimile machine, into a resolution, higher than said resolution of said binary image data, for printing by a printer.

* * * * *